United States Patent
Ohishi et al.

(10) Patent No.: US 10,759,481 B2
(45) Date of Patent: Sep. 1, 2020

(54) SPROCKET WHEEL AND METHOD FOR PRODUCING THE SAME

(71) Applicant: KOMATSU LTD., Tokyo (JP)

(72) Inventors: Masayuki Ohishi, Neyagawa (JP); Masaharu Amano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 591 days.

(21) Appl. No.: 15/500,644

(22) PCT Filed: Nov. 18, 2014

(86) PCT No.: PCT/JP2014/080542
§ 371 (c)(1),
(2) Date: Jan. 31, 2017

(87) PCT Pub. No.: WO2016/079815
PCT Pub. Date: May 26, 2016

(65) Prior Publication Data
US 2017/0217516 A1   Aug. 3, 2017

(51) Int. Cl.
*B62D 55/12* (2006.01)
*B23K 9/23* (2006.01)
(Continued)

(52) U.S. Cl.
CPC ............. *B62D 55/12* (2013.01); *B21K 1/30* (2013.01); *B23K 9/04* (2013.01); *B23K 9/048* (2013.01);
(Continued)

(58) Field of Classification Search
CPC ...... B62D 55/20; B62D 55/205; B62D 55/21; B62D 55/12; B62D 55/202;
(Continued)

(56) References Cited

U.S. PATENT DOCUMENTS 2,003,019 A * 5/1935 Strobel ............... B23K 31/025
148/26
2,931,094 A * 4/1960 Teerlink ................ B21D 53/28
29/893.34

(Continued)

FOREIGN PATENT DOCUMENTS

CN  102513776 A   6/2012
CN  102922211 A   2/2013
(Continued)

OTHER PUBLICATIONS

Machine translation of JP 2013-046928, 16 pages (Year: 2013).*
(Continued)

*Primary Examiner* — Jason R Bellinger
(74) *Attorney, Agent, or Firm* — Oliff PLC

(57) ABSTRACT

A sprocket wheel has an annular shape. The sprocket wheel has a plurality of projections formed on an outer peripheral surface for transmitting a driving force to a track. The sprocket wheel includes a base made of a first metal, and an overlay including a second metal that covers the base so as to constitute at least a part of the outer peripheral surface. The overlay is formed with a metallic structure that is continuous in the circumferential direction so as to connect between adjacent ones of the projections.

11 Claims, 10 Drawing Sheets

(51) Int. Cl.
   *B23K 9/04* (2006.01)
   *B23K 9/173* (2006.01)
   *B23K 9/32* (2006.01)
   *B21K 1/30* (2006.01)
   *B62D 55/125* (2006.01)
   *B23K 101/06* (2006.01)
   *B23K 103/04* (2006.01)

(52) U.S. Cl.
   CPC ............... *B23K 9/173* (2013.01); *B23K 9/23* (2013.01); *B23K 9/324* (2013.01); *B62D 55/125* (2013.01); *B23K 2101/06* (2018.08); *B23K 2103/04* (2018.08)

(58) Field of Classification Search
   CPC ...... B62D 55/0963; B23K 9/04; B23K 9/042; B23K 9/044; B23K 9/048; B23K 31/025; B23P 6/007
   See application file for complete search history.

(56) References Cited

U.S. PATENT DOCUMENTS

| | | | | |
|---|---|---|---|---|
| 3,071,490 A * | 1/1963 | Pevar | ........................ | C23C 4/02 118/620 |
| 4,218,494 A * | 8/1980 | Belmondo | ................ | B22F 7/08 219/121.35 |
| 5,852,272 A | 12/1998 | Amano | | |
| 6,414,258 B1 | 7/2002 | Amano | | |
| 6,846,261 B2 * | 1/2005 | Lev | ........................ | F16H 55/06 29/893.1 |
| 7,163,754 B2 * | 1/2007 | Revankar | .................. | C23C 2/28 148/526 |
| 2009/0019783 A1 * | 1/2009 | Amano | .................... | B23K 9/04 51/309 |
| 2015/0033561 A1 * | 2/2015 | Bruck | ..................... | F01D 5/147 29/889.71 |
| 2015/0377263 A1 * | 12/2015 | Dupuis | ............... | F15B 15/2846 92/5 R |
| 2017/0216950 A1 * | 8/2017 | Ohishi | ..................... | B23K 9/04 |
| 2017/0216951 A1 * | 8/2017 | Ohishi | ..................... | B23K 9/04 |
| 2017/0216976 A1 * | 8/2017 | Ohishi | ..................... | B23K 9/04 |
| 2018/0127036 A1 * | 5/2018 | Ohishi | .................. | B62D 55/26 |

FOREIGN PATENT DOCUMENTS

| | | | | |
|---|---|---|---|---|
| JP | H03-23025 A | | 1/1991 | |
| JP | H05-77042 A | | 3/1993 | |
| JP | H08-47774 A | | 2/1996 | |
| JP | 2000-343219 A | | 12/2000 | |
| JP | 2007-268552 A | | 10/2007 | |
| JP | 2008-000763 A | | 1/2008 | |
| JP | 2013-046928 A | | 3/2013 | |
| JP | 2013046928 A | * | 3/2013 | ............... B21K 1/24 |

OTHER PUBLICATIONS

Jan. 13, 2015 International Search Report issued in International Patent Application No. PCT/JP2014/080542.

Yang Jiangao et al., "Cemented Carbide" Central South University Publishing House, pp. 443-447, 2012.

Hao Youjun, "Quick Start for Benchwork," National Defense Industry Press, First Ed., Apr. 2007, pp. 133-134.

* cited by examiner

SPROCKET WHEEL AND METHOD FOR PRODUCING THE SAME

This is a National Stage entry of Application No. PCT/JP2014/080542 filed Nov. 18, 2014.

TECHNICAL FIELD

The present invention relates to sprocket wheels and methods for producing the sprocket wheels, and more particularly, to a sprocket wheel having an overlay formed on its outer peripheral surface and a method for producing the sprocket wheel.

BACKGROUND ART

A sprocket wheel, which transmits a driving force to a track in a tracked undercarriage, rotates while meshing with bushings of the track in an environment where earth and sand exists. The outer peripheral surface of the sprocket wheel, meshing with the bushings, is thus required to have high wear resistance. As a way of improving wear resistance, an overlay may be formed on the outer peripheral surface of the sprocket wheel. As such an overlay, one having hard particles dispersed in a matrix made of steel, for example, can be adopted. The overlay can be formed, for example, by overlaying welding. In the case of forming an overlay on an outer peripheral surface of a sprocket wheel by overlaying welding, it has been proposed to form the overlay such that beads constituting the overlay extend in a direction perpendicular to the circumferential direction, or, in a tooth width direction of the sprocket wheel (see, for example, Japanese Patent Application Laid-Open No. 2000-343219 (Patent Literature 1), Japanese Patent Application Laid-Open No. 2008-763 (Patent Literature 2), and Japanese Patent Application Laid-Open No. H8-47774 (Patent Literature 3)).

CITATION LIST

Patent Literature

Patent Literature 1: Japanese Patent Application Laid-Open No. 2000-343219
Patent Literature 2: Japanese Patent Application Laid-Open No. 2008-763
Patent Literature 3: Japanese Patent Application Laid-Open No. H8-47774

SUMMARY OF INVENTION

Technical Problem

In the sprocket wheel, projections formed on the outer peripheral surface mesh with the bushings to rotate the track. The projections of the sprocket wheel thus receive a force making the projections sway in the circumferential direction. When the beads are formed to extend in the direction perpendicular to the circumferential direction as in Patent Literature 1 above, the force will act in the direction perpendicular to the interface between the neighboring beads. When such a force acts on the interface at which the metallic structures are discontinuous, cracking may occur and even extend along the interface. Occurrence and extension of such cracking will lead to splitting of the overlay and to deterioration in wear resistance of the sprocket wheel.

An object of the present invention is to improve wear resistance of a sprocket wheel by preventing occurrence and extension of cracking in the overlay.

Solution to Problem

A sprocket wheel according to the present invention is a sprocket wheel having an annular shape and having a plurality of projections formed on an outer peripheral surface for transmitting a driving force to a track. The sprocket wheel includes: a base made of a first metal; and an overlay, including a second metal, which covers the base so as to constitute at least a part of the outer peripheral surface. The overlay is formed with a metallic structure that is continuous in a circumferential direction so as to connect between adjacent ones of the projections.

In the sprocket wheel of the present invention, the overlay is formed with the metallic structure that is continuous in the circumferential direction so as to connect between adjacent ones of the projections. This prevents occurrence of cracking in the overlay due to the force acting to make the projections sway in the circumferential direction, and makes the sprocket wheel improved in wear resistance. Thus, according to the sprocket wheel in the present invention, it is possible to improve the wear resistance of the sprocket wheel by preventing occurrence and extension of cracking in the overlay.

In the sprocket wheel described above, the overlay may be formed with the metallic structure that is also continuous in a direction intersecting the circumferential direction. When the overlay is formed to have a metallic structure that is continuous not only in the circumferential direction but also in a direction intersecting the circumferential direction, occurrence and extension of cracking can be prevented against forces acting in various directions.

In the sprocket wheel described above, the overlay may include a matrix made of the second metal, and hard particles dispersed in the matrix. This facilitates formation of an overlay excellent in wear resistance.

In the sprocket wheel described above, the hard particles located in an overlay surface region, which is a region within an average particle diameter of the hard particles from the surface of the overlay, may be arranged side by side while being embedded in the overlay. This prevents the hard particles from being arranged protruding noticeably from the surface of the overlay. As a result, the hard particles are prevented from falling off during the use of the sprocket wheel. It should be noted that the average particle diameter of the hard particles can be obtained by observing a cross section perpendicular to the surface of the overlay with an optical microscope, and by calculating an average of the diameters of ten hard particles observed.

In the sprocket wheel described above, the hard particles located in the overlay surface region may be arranged in contact with the surface of the overlay. With this, the region of a hard particle exposed from the surface of the overlay becomes small, which prevents the hard particle from falling off.

In the sprocket wheel described above, among the hard particles located in the overlay surface region, any hard particle having a region exposed from the surface of the overlay may have an acute central angle (of less than 90°) corresponding to the region exposed from the surface of the overlay. With this, the region of a hard particle exposed from the surface of the overlay becomes small, which prevents the hard particle from falling off.

In the sprocket wheel described above, in a region including an interface between the overlay and the base, the overlay may include a protrusion that protrudes toward the base. This prevents the overlay from coming off the base.

In the sprocket wheel described above, the protrusion may have at least a part of the hard particle received therein. This more reliably prevents the overlay from coming off the base.

A sprocket wheel producing method according to the present invention is a method for producing a sprocket wheel having an annular shape and having a plurality of projections formed on an outer peripheral surface for transmitting a driving force to a track. This sprocket wheel producing method includes the steps of: preparing a base member made of a first metal; forming an overlay including a second metal in contact with a surface of the base member to cover at least a part of the surface; and hot forging the base member having the overlay formed, such that the overlay constitutes the outer peripheral surface, such that the plurality of projections are formed on the outer peripheral surface to project radially outward, and such that the overlay is worked.

In the sprocket wheel producing method of the present invention, the base member having the overlay formed is hot forged such that the overlay is worked. Thus, the metal forming the overlay recrystallizes, resulting in a continuous metallic structure in the overlay. According to the sprocket wheel producing method of the present invention, it is readily possible to produce the above sprocket wheel of the present invention by making the metallic structure continuous in the overlay.

In the sprocket wheel producing method described above, the step of forming the overlay may include forming the overlay including a matrix made of the second metal and hard particles dispersed in the matrix. This facilitates formation of an overlay excellent in wear resistance.

Effects of Invention

As is clear from the above description, according to the sprocket wheel and its producing method of the present invention, it is possible to improve wear resistance of the sprocket wheel by preventing occurrence and extension of cracking in the overlay.

DESCRIPTION OF EMBODIMENTS

Figure 1:
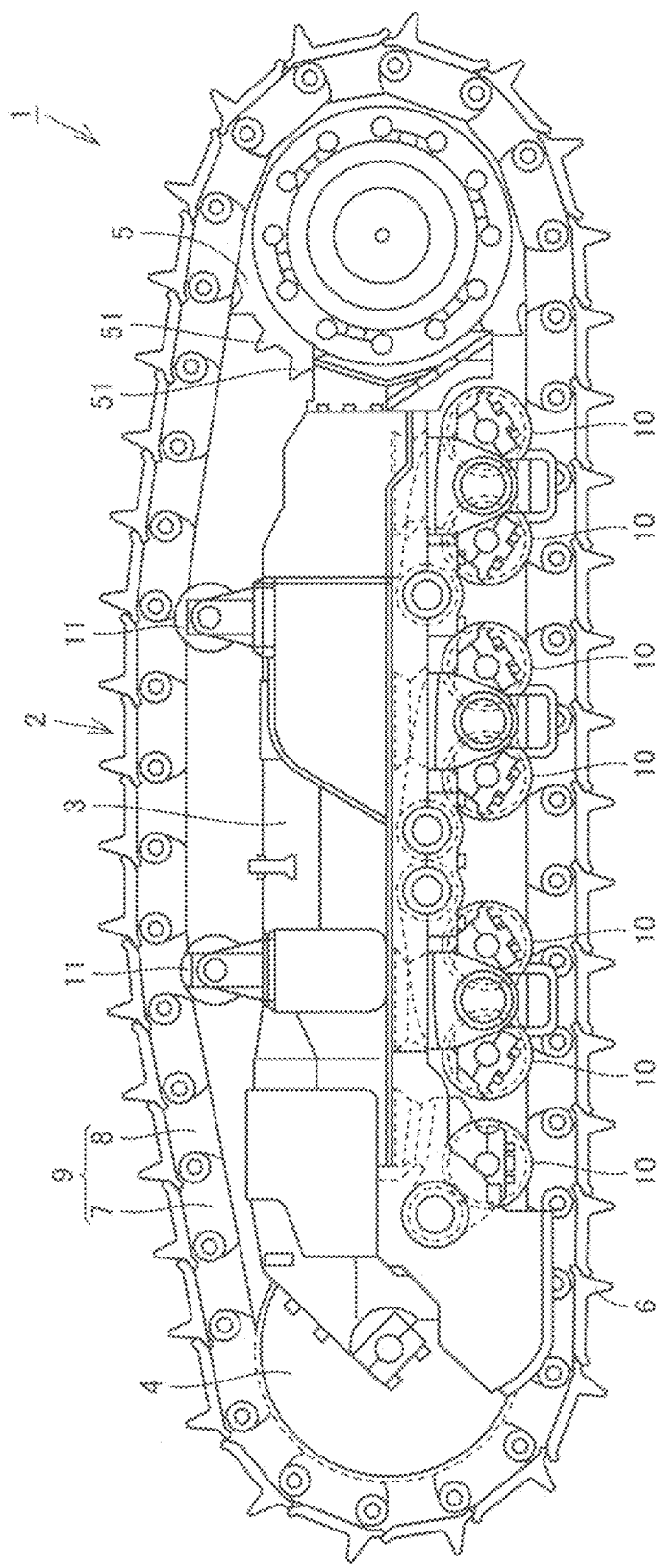
FIG. 1 is a schematic diagram showing the structure of a track travel device.

An embodiment of the present invention will be described below. In the following drawings, the same or corresponding parts are denoted by the same reference numerals, and the description thereof will not be repeated.

Figure 2:
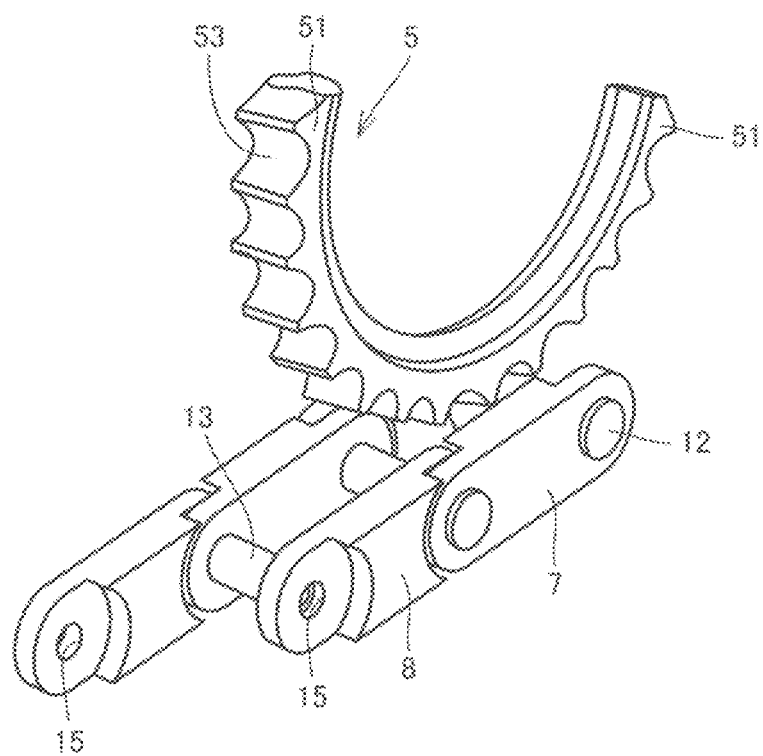
FIG. 2 is a schematic diagram illustrating operations of a sprocket wheel and bushings.
Figure 3:
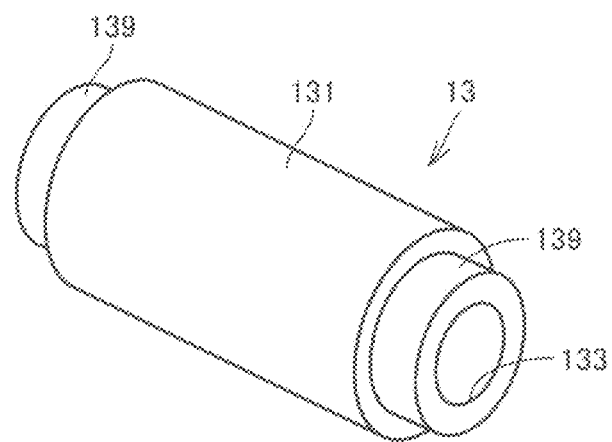
FIG. 3 is a schematic perspective view showing the structure of a bushing.
Figure 4:
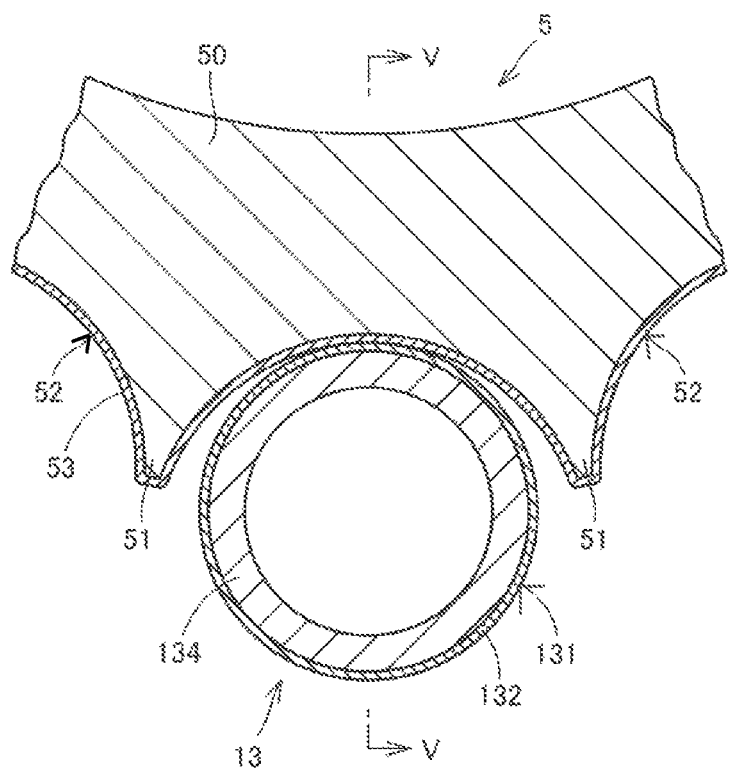
FIG. 4 is a schematic cross-sectional view showing the contact state of the sprocket wheel and a bushing.
Figure 5:
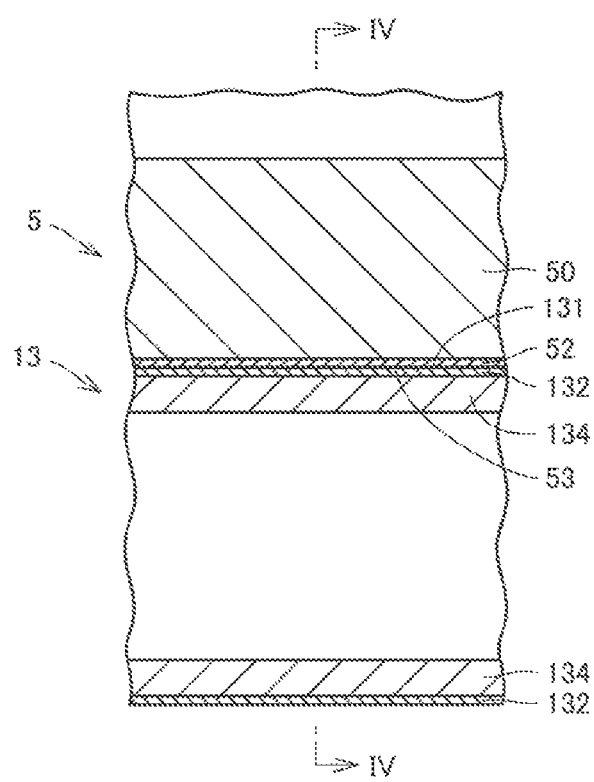
FIG. 5 is a schematic cross-sectional view taken along the line V-V in FIG. 4.

A sprocket wheel according to an embodiment of the present invention will be described with reference to FIGS. 1 to 5. FIG. 1 is a schematic diagram showing the structure of a track travel device. FIG. 2 is a schematic diagram illustrating operations of a sprocket wheel and bushings. FIG. 3 is a schematic perspective view showing the structure of a bushing. FIGS. 4 and 5 are schematic cross-sectional views showing the contact state of the sprocket wheel and a bushing.

Referring to FIG. 1, a track travel device 1 in the present embodiment is a travel device for a work machine such as a bulldozer, and includes: a track 2; a track frame 3; an idler tumbler 4; a sprocket wheel 5; a plurality of (here, seven) track rollers 10; and a plurality of (here, two) carrier rollers 11.

The track 2 includes a plurality of track links 9, which are connected endlessly, and track shoes 6, which are fixed to the corresponding track links 9. The track links 9 include outer links 7 and inner links 8. The outer links 7 and the inner links 8 are connected alternately.

The idler tumbler 4, the plurality of track rollers 10, and the plurality of carrier rollers 11 are attached to the track frame 3 in such a manner that they are rotatable about their respective axes. The sprocket wheel 5 is arranged on one end of the track frame 3. A power source such as an engine is connected to the sprocket wheel 5, and the sprocket wheel 5, driven by the power source, rotates about its axis. On an outer peripheral surface of the sprocket wheel 5, a plurality of projections 51 are arranged which project radially outward. The projections 51 mesh with the track 2. The rotation of the sprocket wheel 5 is thus transmitted to the track 2. The track 2, driven by the rotation of the sprocket wheel 5, rotates in a circumferential direction.

The idler tumbler 4 is attached to the other end (opposite to the end where the sprocket wheel 5 is arranged) of the track frame 3. Further, on the track frame 3, in the region sandwiched between the sprocket wheel 5 and the idler tumbler 4, the track rollers 10 and the carrier rollers 11 are attached respectively on the ground contact side and on the side opposite to the ground contact side. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

Referring to FIG. 2, an outer link 7 and an inner link 8 adjacent to each other are connected by means of a connecting pin 12 and a bushing 13. Each inner link 8 has two through holes 15 formed to penetrate in a direction perpendicular to the plane of rotation of the track 2. One and the other of these two through holes 15 are formed on one end and the other end, respectively, in the longitudinal direction of the link. Each outer link 7 has two through holes 15 formed to penetrate in a direction perpendicular to the plane of rotation of the track 2. One and the other of these two through holes 15 are formed on one end and the other end, respectively, in the longitudinal direction of the link.

Referring to FIG. 3, the bushing 13 has a hollow cylindrical shape. The bushing 13 has a smaller-diameter portion 139, having a smaller outer diameter, formed on each end. The bushing 13 has an inner peripheral surface 133 having a constant diameter over the length. The bushing 13 is reduced in thickness in the smaller-diameter portions 139.

Referring to FIGS. 2 and 3, a pair of outer links 7 are arranged such that their two through holes 15 are aligned respectively as seen from the direction perpendicular to the plane of rotation of the track 2. A pair of inner links 8 are arranged such that their two through holes 15 are aligned respectively as seen from the direction perpendicular to the plane of rotation of the track 2. An outer link 7 and an inner link 8 adjacent to each other are arranged such that one through hole 15 of the outer link 7 and one through hole 15 of the inner link 8 are aligned as seen from the direction perpendicular to the plane of rotation of the track 2. A bushing 13 is arranged such that it is sandwiched between a pair of inner links 8 and such that the smaller-diameter portion 139 on each end is inserted into a through hole 15 of the corresponding inner link 8. A connecting pin 12 is arranged to penetrate through the through holes 15 of the neighboring outer and inner links 7 and 8, the holes being aligned as seen from the direction perpendicular to the plane of rotation of the track 2, and through the space surrounded by the inner peripheral surface 133 of the corresponding bushing 13. The connecting pin 12 is arranged to penetrate through the bushing 13 in the longitudinal direction.

The sprocket wheel 5 rotates in a circumferential direction, with its outer peripheral surface 53 meshing with outer peripheral surfaces 131 of the bushings 13 constituting the track 2. The outer peripheral surface 53 of the sprocket wheel 5 is thus required to have high wear resistance. The sprocket wheel 5 is a machine component that slides relative to another component, which is the bushing 13, while being in contact with the bushing 13 in the contact region, which is the outer peripheral surface 53.

Referring to FIGS. 4 and 5, the sprocket wheel 5 has an annular shape. On the outer peripheral surface 53 of the sprocket wheel 5, a plurality of projections 51 are formed which are for transmitting a driving force to the bushings 13 of the track 2. The sprocket wheel 5 includes a base 50 made of a first metal, and an overlay 52 which covers the base 50 so as to form the outer peripheral surface 53, which is the contact region. The overlay 52 includes a second metal. The overlay 52 is formed with a metallic structure that is continuous in the circumferential direction so as to connect between adjacent ones of the projections 51. As the first metal forming the base 50, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted.

Further, the outer peripheral surface 53 which is the surface of the overlay 52 has been smoothed. Here, the state in which the outer peripheral surface 53, i.e. the surface of the overlay 52, is smoothed refers to the state in which surface profile affected by surface tension and the like at the time of formation of the overlay 52 in the liquid state has been eliminated from the surface of the overlay 52. In the present embodiment, the outer peripheral surface 53, which is the surface of the overlay 52, is a forged surface. The outer peripheral surface 53, or, the surface of the overlay 52 affected by surface tension and the like during formation of the overlay 52 in the liquid state, has been smoothed by forging.

A bushing 13 includes a base 134, and an overlay 132 which covers the base 134 so as to form the outer peripheral surface 131, which is the contact region.

In the sprocket wheel 5 in the present embodiment, the overlay 52 is formed with a metallic structure continuous in the circumferential direction so as to connect between adjacent ones of the projections 51. This prevents occurrence of cracking in the overlay 52 otherwise caused by the force acting to make the projections 51 sway in the circumferential direction, and makes the sprocket wheel 5 improved in wear resistance. Thus, according to the sprocket wheel 5 in the present embodiment, it is possible to improve the wear resistance of the sprocket wheel 5 by preventing occurrence and extension of cracking in the overlay 52. Here, the state in which the metallic structure of the second metal is continuous in the circumferential direction means the state in which the metal has a microstructure that is continuous in the circumferential direction. The overlay 52 may be formed with the metallic structure that is also continuous in a direction intersecting the circumferential direction. This makes it possible to prevent occurrence and extension of cracking against forces acting in various directions.

Figure 6:
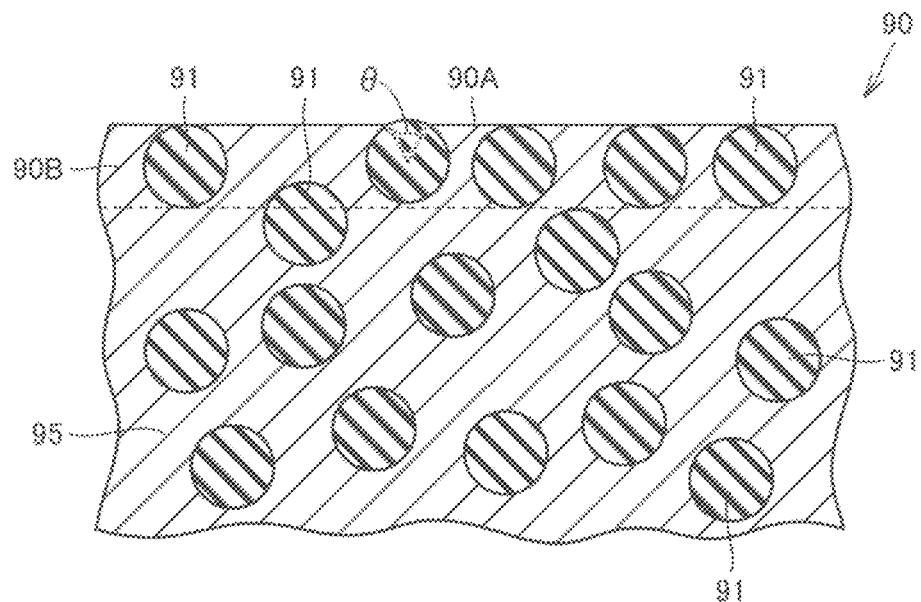
FIG. 6 is a schematic cross-sectional view showing the structure of an overlay at and near its surface.
Figure 7:
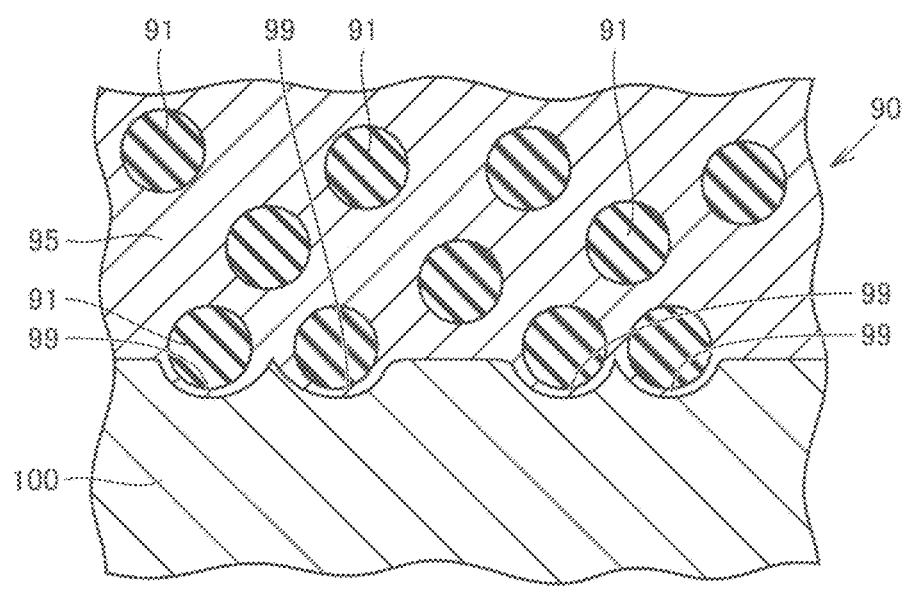
FIG. 7 is a schematic cross-sectional view showing the structure at and around an interface between the overlay and a base.

A description will now be made about the structure of an overlay formed on the sprocket wheel 5. FIG. 6 is a schematic cross-sectional view showing the structure of an overlay at and near its surface. FIG. 7 is a schematic cross-sectional view showing the structure at and around an interface between the overlay and a base. Referring to FIGS. 6 and 7, an overlay 90 (overlay 52) formed on the sprocket wheel 5 includes a matrix 95 made of a second metal, and hard particles 91 dispersed in the matrix 95. The second metal forming the matrix 95 can be, for example, a mixture of a metal derived from a welding wire and the metal (first metal) forming a base 100 (base 50). As the hard particles 91, particles having higher hardness than the matrix 95, for example particles of cemented carbide, can be adopted. The overlay 90 has higher wear resistance than the base 100.

Referring to FIG. 6, the surface 90A of the overlay 90 is a forged surface. The hard particles 91 located in an overlay surface region 90B, which is a region within an average particle diameter of the hard particles 91 from the surface 90A of the overlay 90, are arranged side by side while being embedded in the overlay 90. This prevents the hard particles 91 from being arranged protruding noticeably from the surface 90A of the overlay 90. This consequently prevents the hard particles 91 from falling off during the use of the sprocket wheel 5, leading to improved wear resistance of the sprocket wheel 5.

The hard particles 91 located in the overlay surface region 90B may be arranged in contact with the surface 90A of the overlay 90, as shown in FIG. 6. With this, the region of a hard particle 91 exposed from the surface 90A of the overlay 90 becomes small, which prevents the hard particle 91 from falling off.

As shown in FIG. 6, among the hard particles 91 located in the overlay surface region 90B, any hard particle 91 having a region exposed from the surface 90A of the overlay 90 may have an acute central angle θ (of less than 90°) corresponding to that exposed region. With this, the region of a hard particle 91 exposed from the surface 90A of the overlay 90 becomes small, which prevents the hard particle 91 from falling off.

Referring to FIG. 7, in a region including an interface between the overlay 90 and the base 100, the overlay 90 includes protrusions 99 that protrude toward the base 100. The protrusions 99 provide an anchor effect to prevent the overlay 90 from coming off the base 100. A protrusion 99 receives at least a part of a hard particle 91. This more reliably prevents the overlay 90 from coming off the base 100. There exists the matrix 95 of the overlay 90 between the base 100 and the hard particle 91 received in the protrusion 99. The hard particle 91 received in the protrusion 99 is not in contact with the base 100. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 8:
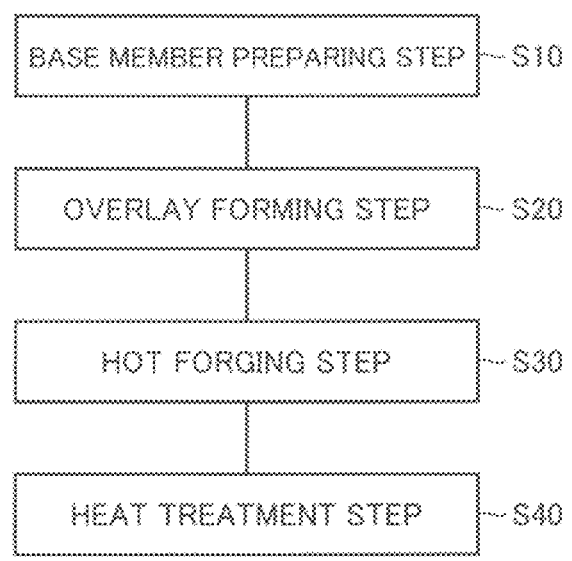
FIG. 8 is a flowchart schematically illustrating a method for producing a sprocket wheel.
Figure 9:
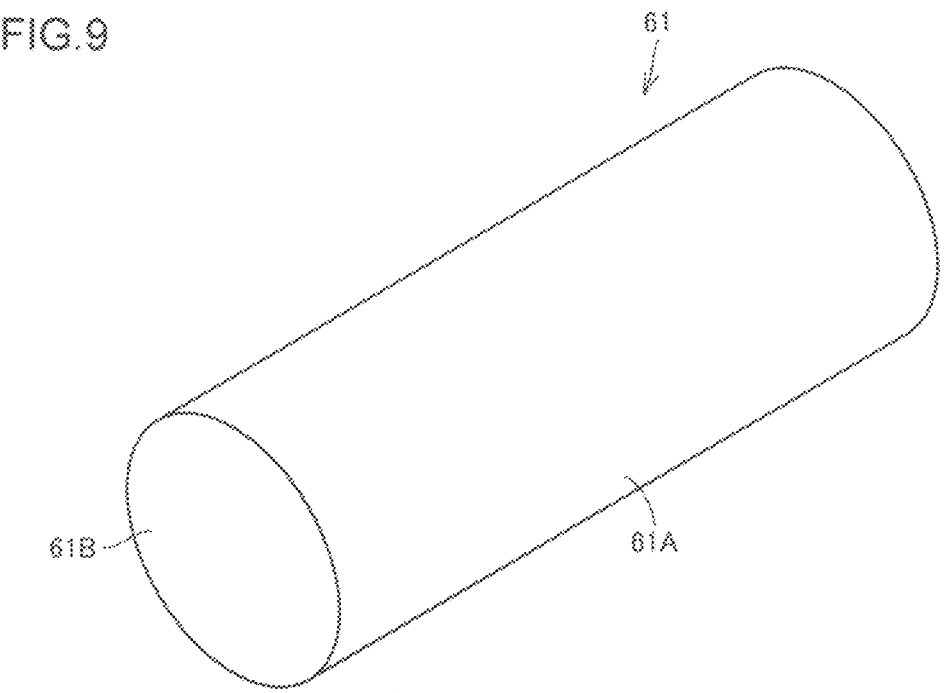
FIG. 9 is a schematic perspective view illustrating the method for producing the sprocket wheel.
Figure 10:
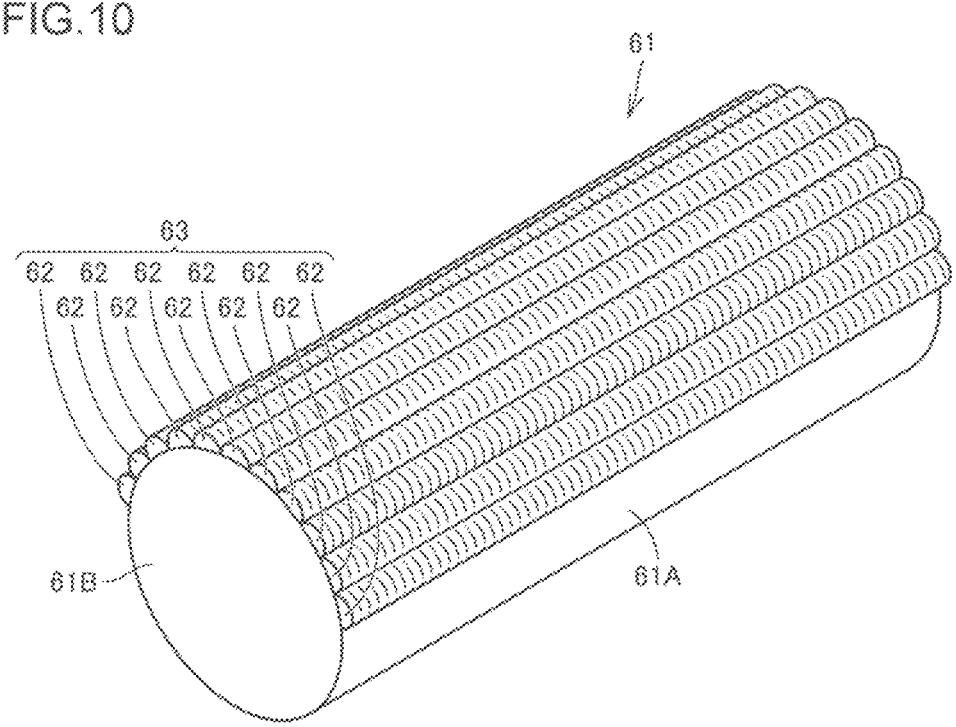
FIG. 10 is a schematic perspective view illustrating the method for producing the sprocket wheel.
Figure 11:
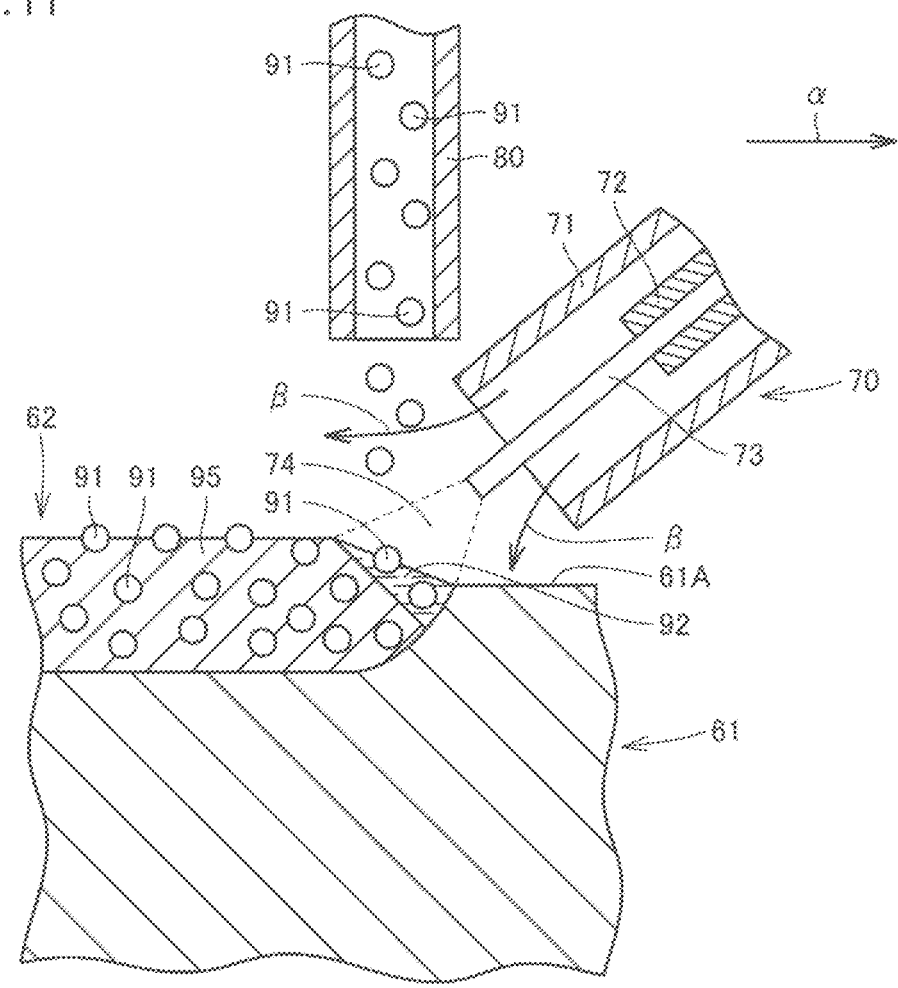
FIG. 11 is a schematic cross-sectional view illustrating a method for forming an overlay.

A method for producing a sprocket wheel 5 in the present embodiment will now be described with reference to FIGS. 8 to 13. FIG. 8 is a flowchart schematically illustrating a method for producing a sprocket wheel. FIGS. 9, 10, 12, and 13 are schematic perspective views illustrating the method for producing the sprocket wheel. FIG. 11 is a schematic cross-sectional view illustrating a method for forming an overlay.

Referring to FIG. 8, in the method for producing a sprocket wheel 5 in the present embodiment, first, a base member preparing step is carried out as a step S10. In this step S10, referring to FIG. 9, a base member 61, which is to be a base 50 of the sprocket wheel 5, is prepared. The base member 61 is made of a metal forming the base 50. The base member 61 is of a cylindrical shape. The base member 61 includes a pair of end faces 61B and a side face 61A connecting the end faces 61B.

Next, an overlay forming step is carried out as a step S20. In this step S20, referring to FIGS. 9 and 10, an overlay 63 is formed to cover a part of the side face 61A of the base member 61 prepared in the step S10. The overlay 63 is formed over the entire area in the longitudinal direction of the base member 61. The overlay 63 is formed in a part in the circumferential direction (over approximately a half in the circumferential direction) of the base member 61. The overlay 63 has a structure in which beads 62, extending in the longitudinal direction of the base member 61, are laid side by side in the circumferential direction, with no gaps therebetween. The beads 62 are formed to extend in a direction corresponding to the circumferential direction of the sprocket wheel 5.

The overlay 63 may be formed by, for example, overlaying welding using $CO_2$ arc welding as described below. First, an overlay forming device will be described. Referring to FIG. 11, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire, JIS YGW12, for example, can be adopted. A gap between the welding nozzle 71 and the contact tip 72 is a flow path of shielding gas. The shielding gas flowing through the flow path is discharged from the tip end of the welding nozzle 71. The hard particles supplying nozzle 80 has a hollow cylindrical shape. Inside the hard particles supplying nozzle 80, hard particles 91 are supplied, which are discharged from the tip end of the hard particles supplying nozzle 80.

This overlay forming device can be used to form an overlay 63 through the following procedure. With a base member 61 as one electrode and the welding wire 73 as another electrode, voltage is applied across the base member 61 and the welding wire 73. This generates an arc 74 between the welding wire 73 and the base member 61. The arc 74 is shielded from the ambient air by the shielding gas discharged from the tip end of the welding nozzle 71 along the arrows β. For the shielding gas, carbon dioxide, for example, can be adopted. The heat in the arc 74 melts a part of the base member 61 and also melts the tip end of the welding wire 73. The tip end of the welding wire 73 thus molten forms droplets, which transfer to the molten region of the base member 61. This forms a molten pool 92 which is a liquid region where the molten base member 61 and the molten welding wire 73 are mixed together. The hard particles 91 discharged from the hard particles supplying nozzle 80 are supplied to this molten pool 92.

As the welding torch 70 and the hard particles supplying nozzle 80 constituting the overlaying welding device move relatively in the direction shown by the arrow a with respect to the base member 61, the position where the molten pool 92 is formed move accordingly. The molten pool 92 previously formed solidifies, resulting in a bead 62. The bead 62 includes a matrix 95 formed by solidification of the molten pool 92, and hard particles 91 dispersed in the matrix 95. A plurality of such beads 62 are formed next to one another in the width direction, with no gaps therebetween, to cover a desired region on the side face 61A of the base member 61, whereby formation of the overlay 63 is completed (see FIG. 10). It should be noted that overlaying welding can be carried out, for example, under the following conditions: welding current of 230 A, welding voltage of 17 V, hard particles feed rate of 110 g/min, and excess bead height of 4 mm. For the welding wire, JIS YGW11 may be adopted. For the hard particles, WC- or $W_2C$-based particles may be adopted.

Figure 12:
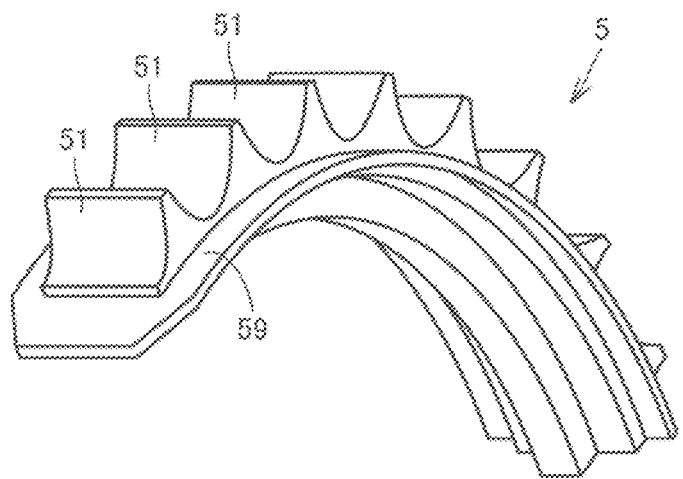
FIG. 12 is a schematic perspective view illustrating the method for producing the sprocket wheel.
Figure 13:
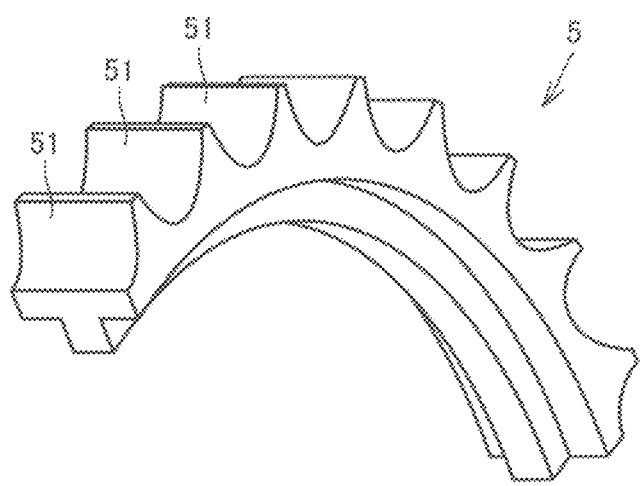
FIG. 13 is a schematic perspective view illustrating the method for producing the sprocket wheel.

Next, a hot forging step is carried out as a step S30. In this step S30, the base member 61 with the overlay 63 formed in the step S20 is hot forged. Referring to FIGS. 10 and 12, the base member 61 with the overlay 63 formed is heated to a temperature enabling hot forging, and then placed in a die having a cavity corresponding to a desired shape of the sprocket wheel 5, for forging. In the present embodiment, a plurality of arc-shaped parts, constituting an annular sprocket wheel 5, are produced by hot forging. The resultant parts are assembled in a later step, to obtain the annular sprocket wheel 5. With hot forging, the overlay 63 formed in the step S20 is worked. The base member 61 is hot forged such that the overlay 63 covers the outer peripheral surface of the sprocket wheel 5. With this, the second metal forming the overlay 63 recrystallizes, so the microstructure of the metal becomes continuous even in the region that was the interface between the neighboring beads 62. As a result, in the forged overlay 52, the microstructure of the metal becomes continuous, not only in the circumferential direction of the sprocket wheel 5, but also in a direction intersecting the circumferential direction (for example, in the direction perpendicular to the circumferential direction). Further, the overlay 52 having a smooth surface is obtained, from which surface profile affected by surface tension in the liquid state and so on has been eliminated. As a result of hot forging, burr 59 is formed, as shown in FIG. 12. Thereafter, referring to FIGS. 12 and 13, die-cutting is carried out to remove the burr 59, whereby a part constituting the sprocket wheel 5 is obtained (see FIG. 13).

Referring to FIGS. 11 and 6, as the base member 61 having the overlay 63 formed is hot forged, hard particles 91 that were protruding from a surface of the overlay 63 (beads 62) during formation of the overlay 63 are pressed into the overlay 63 (beads 62). As a result, in the sprocket wheel 5, the hard particles 91 located in the overlay surface region 90B are arranged side by side while being embedded in the overlay 90. The hard particles 91 located in the overlay surface region 90B are arranged in contact with the surface 90A of the overlay 90. Among the hard particles 91 located in the overlay surface region 90B, any hard particle 91 having a region exposed from the surface 90A of the overlay 90 has an acute central angle θ (of less than 90°) corresponding to the exposed region. This prevents the hard particle 91 from falling off during the use of the sprocket wheel 5, leading to improved wear resistance of the sprocket wheel 5.

Referring to FIGS. 11 and 7, as the base member 61 having the overlay 63 formed is hot forged, protrusions 99 are formed in the overlay 90 in consequence of the hard particles 91 that were located in the vicinity of the interface between the overlay 63 (beads 62) and the base member 61 at the time of formation of the overlay 63 (beads 62). In a protrusion 99, at least a part of a corresponding hard particle 91 is received. The above process simultaneously forms the surface region of the overlay 90 which is excellent in wear resistance with the hard particles 91 arranged in contact with the surface 90A, and the protrusions 99 which prevent the overlay 90 from coming off the base 100.

Referring to FIG. 8, next, a heat treatment step is carried out as a step S40. In this step S40, the sprocket wheel 5 (the part constituting the sprocket wheel 5) obtained through hot forging in the step S30 is subjected to heat treatment. The heat treatment carried out in the step S40 is, for example, quenching and tempering. This imparts desired hardness and toughness to the base 50 of the sprocket wheel 5. Thereafter, in order to make it possible to mount the sprocket wheel 5 on a support body (not shown), a region where no overlay 90 has been formed is subjected to machining for the purposes of improving dimensional accuracy, forming a mounting hole, and so on. The sprocket wheel 5 (the part constituting the sprocket wheel 5) in the present embodiment is thus completed.

EXAMPLES

A test piece was produced by forming an overlay on a base member by overlaying welding and by hot forging the base member to make the overlay worked, as in the producing method described in the above embodiment (Example). For comparison, another test piece was produced by forming an overlay after hot forging (Comparative example). The dies used for hot forging in the Example and in the Comparative example were of the same shape. Each test piece produced was cut, and the state of the overlay was observed with an optical microscope.

Figure 14:
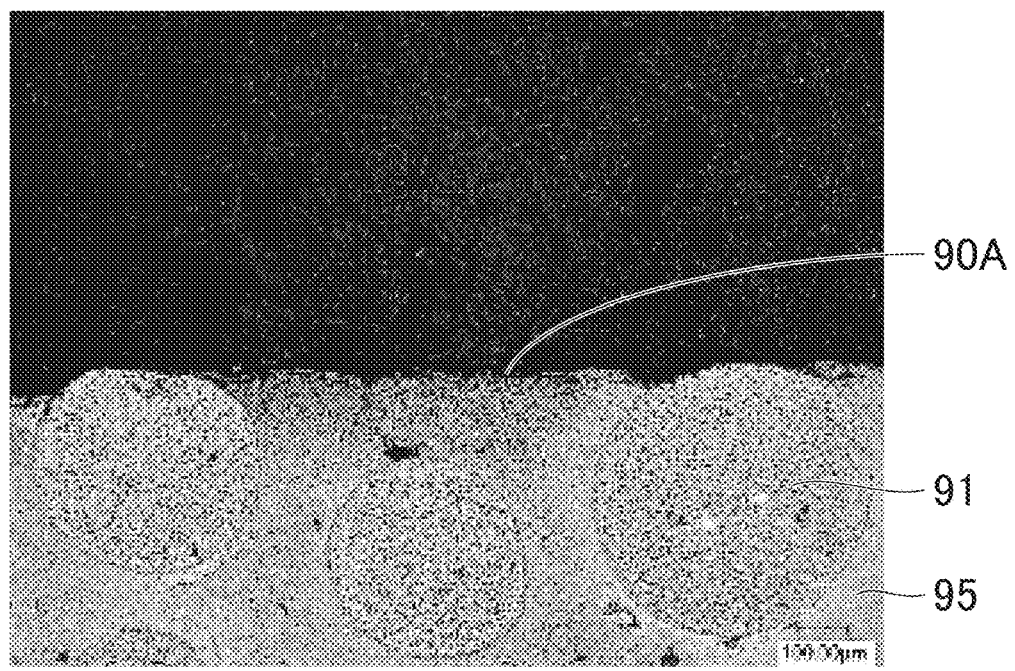
FIG. 14 is an optical micrograph showing a surface and its vicinity of an overlay (Example)
Figure 15:
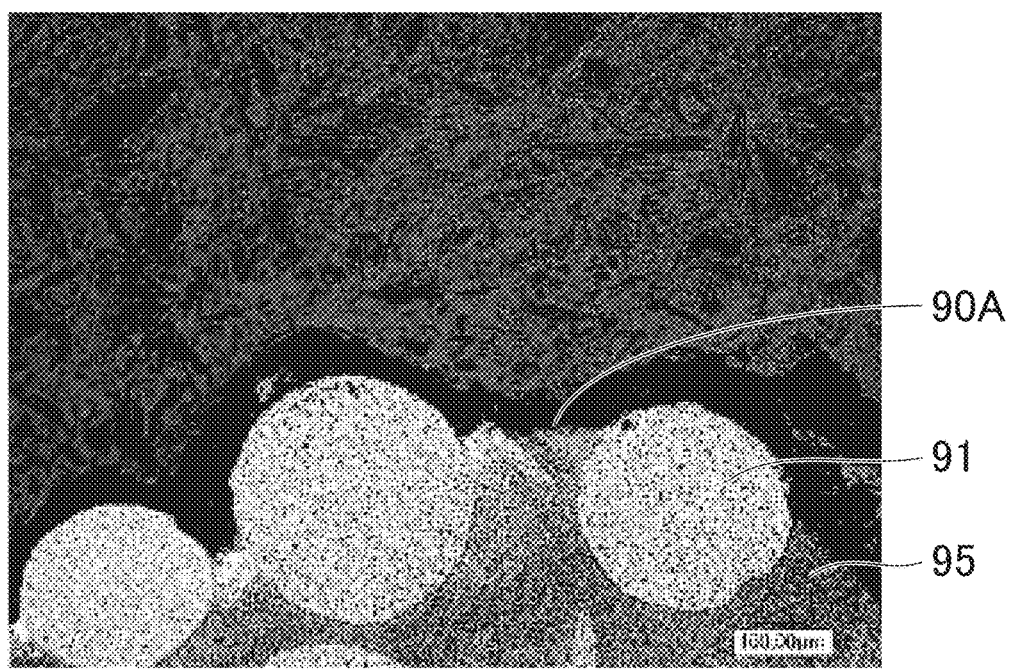
FIG. 15 is an optical micrograph showing a surface and its vicinity of an overlay (Comparative example)

FIG. 14 is an optical micrograph obtained by imaging a surface and its vicinity of the overlay of the Example. FIG. 15 is an optical micrograph obtained by imaging a surface and its vicinity of the overlay of the Comparative example. As shown in FIG. 15, in the overlay of the Comparative example, which has been formed by overlaying welding and not worked by forging thereafter, hard particles 91 protrude noticeably from the surface 90A of the overlay. Referring to FIG. 14, in the overlay of the Example, which has been formed and then worked by forging, hard particles 91 located in the surface region are arranged side by side in the state being embedded in the overlay (matrix 95). The hard particles 91 are aligned in contact with the surface 90A of the overlay. A hard particle 91 having a region exposed from the surface 90A of the overlay 90 has an acute central angle θ (of less than 90°) corresponding to the exposed region. This is presumably because, during the process in which the overlay is worked by forging, the hard particles 91 that were protruding from the surface 90A of the overlay are pressed into the matrix 95 having relatively low hardness.

Figure 16:
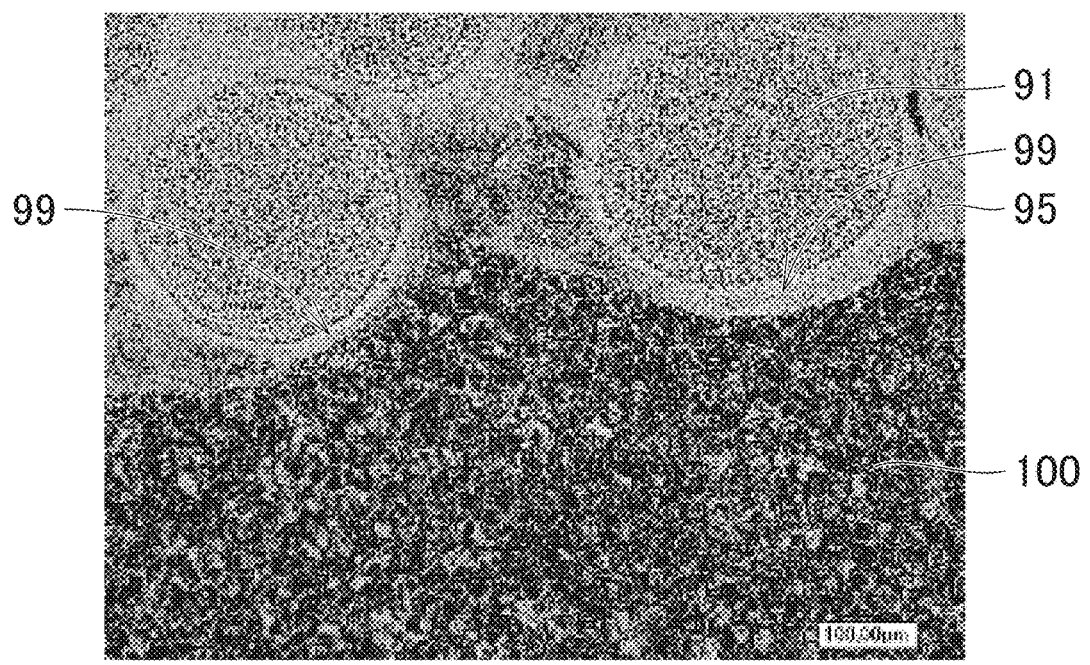
FIG. 16 is an optical micrograph showing an interface between an overlay and a base and its vicinity (Example)
Figure 17:
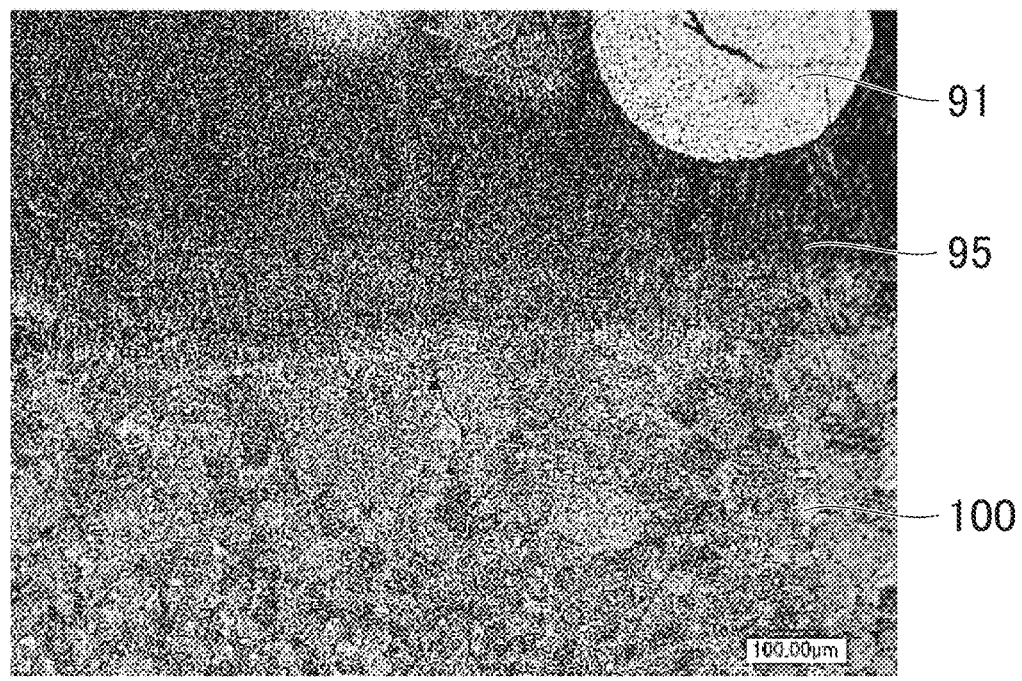
FIG. 17 is an optical micrograph showing an interface between an overlay and a base and its vicinity (Comparative example).

FIG. 16 is an optical micrograph obtained by imaging an interface between the overlay and the base and its vicinity of the Example. FIG. 17 is an optical micrograph obtained by imaging an interface between the overlay and the base and its vicinity of the Comparative example. As shown in FIG. 17, in the Comparative example where the overlay has been formed by overlaying welding and not worked by forging thereafter, the interface between the overlay (matrix 95) and the base 100 is flat. Referring to FIG. 16, in the Example which has been worked by forging after formation of the overlay, in the region including the interface between the overlay (matrix 95) and the base 100, protrusions 99 are formed with the overlay (matrix 95) protruding toward the base 100. In each protrusion 99, a part of a corresponding hard particle 91 is received. It is considered that the protrusions 99 have been formed while the overlay was worked by forging, in consequence of the hard particles 91 present in the vicinity of the interface with the base member. A hard particle 91 that has contributed to the formation of a protrusion 99 has at least a part received in the protrusion 99.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The sprocket wheel and its producing method according to the present invention are applicable particularly advantageously to a sprocket wheel for which improved wear resistance is desired, and to its producing method.

DESCRIPTION OF REFERENCE NUMERALS

1: track travel device; 2: track; 3: track frame; 4: idler tumbler; 5: sprocket wheel; 6: track shoe; 7: outer link; 8: inner link; 9: track link; 10: track roller; 11: carrier roller; 12: connecting pin; 13: bushing; 15: through hole; 50: base; 51: projection; 52: overlay; 53: outer peripheral surface; 59: burr; 61: base member; 61A: side face; 61B: end face; 62: bead; 63: overlay; 70: welding torch; 71: welding nozzle; 72: contact tip; 73: welding wire; 74: arc; 80: hard particles supplying nozzle; 90: overlay; 90A: surface; 90B: overlay surface region; 91: hard particle; 92: molten pool; 95:

matrix; 99: protrusion; 100: base; 131: outer peripheral surface; 132: overlay; 133: inner peripheral surface; 134: base; and 139: smaller-diameter portion.

The invention claimed is:

1. A sprocket wheel having an annular shape and having a plurality of projections formed on an outer peripheral surface of the sprocket wheel for transmitting a driving force to a track, the sprocket wheel comprising:
   a base made of a first metal; and
   an overlay covering the base so as to constitute at least a part of the outer peripheral surface, the overlay being formed with a metallic structure continuous in a circumferential direction so as to connect between adjacent projections of the plurality of projections, and the overlay having a bottom surface contacting the base, the bottom surface forming protrusions extending into the base, the overlay including:
      a matrix made of a second metal; and
      a plurality of hard particles dispersed in the matrix, only one of the plurality of hard particles being only partly located within each of a corresponding one of the protrusions formed in the bottom surface, the plurality of hard particles having a hardness greater than a hardness of the second metal of the matrix.

2. The sprocket wheel according to claim 1, wherein the overlay is formed with the metallic structure that is also continuous in a direction intersecting the circumferential direction.

3. The sprocket wheel according to claim 1, wherein the plurality of hard particles located in an overlay surface region are arranged side by side while being embedded in the overlay, the overlay surface region being a region within an average particle diameter of the plurality of hard particles from a surface of the overlay.

4. The sprocket wheel according to claim 3, wherein the plurality of hard particles located in the overlay surface region are arranged in contact with the surface of the overlay.

5. The sprocket wheel according to claim 3, wherein among the plurality of hard particles located in the overlay surface region, any hard particle of the plurality of hard particles having a region exposed from the surface of the overlay has an acute central angle corresponding to the region exposed from the surface of the overlay.

6. The sprocket wheel according to claim 1, wherein in a region including an interface between the overlay and the base, the overlay includes the protrusions that protrude toward the base.

7. The sprocket wheel according to claim 6, wherein the protrusions each have at least a part of one of the plurality of hard particles received therein.

8. A method for producing a sprocket wheel having an annular shape and having a plurality of projections formed on an outer peripheral surface of the sprocket wheel for transmitting a driving force to a track, the method comprising steps of:
   preparing a base member made of a first metal;
   forming an overlay including a second metal in contact with a surface of the base member to cover at least a part of the surface, the overlay having a bottom surface contacting the base member; and
   hot forging the base member after forming the overlay, such that the overlay constitutes the outer peripheral surface of the sprocket wheel and the plurality of projections are formed on the outer peripheral surface of the sprocket wheel to project radially outward, and the bottom surface of the overlay forms protrusions extending into the base member, the overlay including a plurality of hard particles dispersed in a matrix, only one of the plurality of hard particles being only partly located within each of a corresponding one of the protrusions formed in the bottom surface.

9. The sprocket wheel producing method according to claim 8, wherein the overlay includes a matrix made of the second metal and the plurality of hard particles dispersed in the matrix, the plurality of hard particles having a hardness greater than a hardness of the matrix.

10. The sprocket wheel according to claim 1, wherein a geometric center of each respective hard particle of the plurality of hard particles is located outside of the respective protrusion and a layer of the matrix is located within each of the projections and located between the hard particle and the base.

11. The sprocket wheel producing method according to claim 8, wherein a geometric center of each respective hard particle of the plurality of hard particles is located outside of the respective protrusion and a layer of the matrix is located within each of the projections and located between the hard particle and the base.

* * * * *